July 2, 1935.  H. W. GILLETT  2,006,859
BEARING STRUCTURE
Filed July 14, 1933

INVENTOR.
Horace W. Gillett.
BY
ATTORNEYS

Patented July 2, 1935

2,006,859

UNITED STATES PATENT OFFICE 2,006,859

BEARING STRUCTURE

Horace W. Gillett, Columbus, Ohio, assignor to The Battelle Memorial Institute, Columbus, Ohio, a corporation of Ohio Application July 14, 1933, Serial No. 680,435

3 Claims. (Cl. 308—237)

My invention relates to bearing structure. It has to do particularly with bearings wherein relatively high temperature conditions result from friction and other causes, as in the case of internal combustion engines or the like. However, my invention is not necessarily limited to use in connection with internal combustion engines and is capable of use in other connections.

In the prior art, it was formerly customary to make the backs of babbitted journal bearings of bronze, which was itself a bearing metal. The idea was that, when the babbitt lining was worn through, the shaft would still contact with a bearing metal serviceable under operating conditions, though not as suitable as babbitt itself. However, especially in automotive practice, permissible clearances between a shaft and a worn bearing have become so small that the bearing is ruined by wear long before the backing metal has become exposed so as to act as a bearing surface. As a result, there is no longer any advantage in constructing the bearing back of bearing metal.

The development of these conditions has largely resulted in the practice of using thin steel bearing backs as supports for the babbitt linings and in the consequent displacement of the thicker bronze-backed bearings for main and connecting rod bearings of automotive engines. A certain degree of resilience is desired in the backs so that they may be readily snapped into position. It is also desirable that this resilience be retained at the highest operating temperatures of the bearing. Steel has suitable resilience for this purpose.

However, steel possesses several serious drawbacks. One drawback is that its thermal conductivity is low, so that it does not drain away the heat generated frictionally or otherwise occurring in the bearing so as to transmit it to the bearing support as readily as desired. Likewise, it does not equalize the temperature over the bearing itself and, in consequence, the heat locally generated at various spots on the bearing surface and not uniformly distributed, because of the poor conductivity of the steel back, tends to cause local cracking and wiping of the babbitt lining. This is one of the most serious defects in present day bearings, especially those used in connecting rods.

It has also been suggested that a copper sheet be embeded within a thick babbitt lining, with the babbitt on both the front and back sides of the copper, the theory being that the copper will more readily conduct the heat away from the high temperature points of the bearing. However, such a design is impracticable in modern bearings, where only thin babbitt linings are used. Babbitt has poor thermal conductivity and this suggested design increases the amount of babbitt used and is diametrically at variance with the present day practice of using the smallest possible amount of the poorly conducting babbitt.

One of the objects of my invention is to provide a bearing back which will have high thermal conductivity, sufficient compressive strength to withstand the bearing pressure and sufficient resilience to make it suitable for a "snap-in" bearing.

Another object of my invention is to provide a bearing back having the said enumerated characteristics and being capable of production without material increase in cost.

Various other objects of my invention will appear as this description progresses.

In its preferred form, my invention contemplates the provision of a bearing back made of copper which has been strengthened by cold-working. More specifically, it contemplates the use of cold-worked copper having silver alloyed therewith.

This application is a continuation in part of my application Serial No. 653,514, filed January 25, 1933.

One embodiment of my invention is illustrated diagrammatically in the accompanying drawing wherein similar characters of reference designate corresponding parts and wherein.

Figure 1:
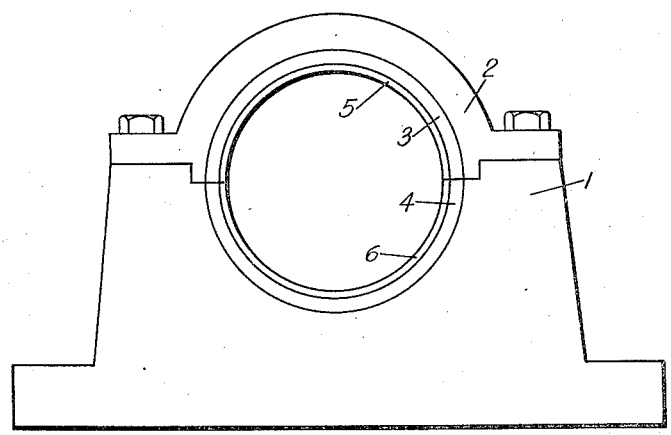
Figure 1 is a side elevation of a bearing structure embodying my invention.
Figure 2:
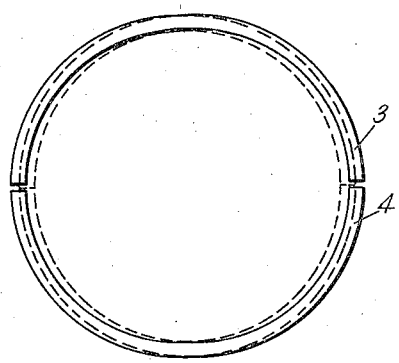
Figure 2 is a side elevation of the bearing removed from the bearing structure and without the bearing metal to be applied thereto.

In the drawing the bearing structure is shown as comprising a support 1, and a cap 2. Mounted in this bearing structure is a bearing back formed in two parts, respectively numbered 3 and 4. Babbitt or similar bearing alloy linings 5 and 6 are carried by the bearing back sections. In automotive practice the linings 5 and 6 may be even thinner in comparison with the thickness of the back now indicated in Figure 1.

These bearing back sections 3 and 4 are made of cold-worked copper. The strengthening of the copper by cold-working imparts sufficient compressive strength to withstand all normal bearing pressures. It also imparts sufficient resilience to make the sections suitable for a "snap-in" bearing.

Under conditions where the bearing is to be subjected to high operating temperatures for long periods of time, as in modern internal combustion engines, I find it desirable to increase the resistance to annealing of the cold-worked copper by alloying silver with the copper. Thus, if the copper carries an appreciable silver content, say 7 to 25 oz. per ton, it is not softened by long use at high engine temperatures nor by the shorter subjection to the still higher temperatures required for tinning and babbitting the copper to form the lined bearing.

The copper without the presence of silver possesses a high thermal conductivity, as is well known. The addition of the silver does not materially injure the thermal conductivity of the copper. Thus, my copper bearing back with silver alloyed therewith combines sufficient compressive strength and resilience to serve as well as steel and, being resistant to tempering, retains these properties. At the same time, it has approximately ten times the thermal conductivity of steel.

Considerable amounts of silver appear in copper that is refined from silver-bearing copper ores and such copper may be obtained at prices not substantially different from those of silver free copper. Hence, the slight additional amount of silver that may be added to the copper to give it the desired ability to maintain its cold-worked hardness does not materially increase the cost. However, as previously indicated, the silver content should range from 7 oz. to 25 oz. per ton of copper.

I may, for example, coat a copper or argentiferous copper bearing back with a suitable bearing metal by the usual methods of tinning or babbitting or by electroplating, and may form strips of copper integral with the bearing back for conducting the heat to relatively cooler areas. The bearing metal may, for example, be chosen from among the various tin base, lead base, or cadmium base bearing alloys, to meet the particular conditions of service.

I have made a comparative test of the merits of bearings embodying my copper silver back upon an engine originally equipped with thin steel backed bearings, by replacing part of these steel backed bearings with bearings having copper silver alloy backs and using the same dimensions of bearing and the same tin base babbit lining. This engine was operated for a long time under heavy load. On examining the bearings, those with steel backs were found to have the babbit cracked, wiped and badly deteriorated, while those with copper silver alloy backs had the babbit in excellent condition and the backs still retained their original resilience. This test showed clearly that the copper silver alloy is superior to steel as a bearing back.

It will be seen from this that I have provided a bearing back structure which, owing to the substitution of a type of material not hitherto used, has superior merit from the standpoint of longevity. It will also be apparent that the new material used by me in forming my bearing back possesses increased thermal conductivity, adequate compressive strength and ample resilience to render it suitable for a "snap-in" bearing.

It will be understood that my invention is applicable to bearings of all types. The type of bearing shown in the drawing is merely illustrative.

Having thus described my invention, what I claim is:

1. A bearing structure comprising a bearing backing formed of cold-worked argentiferous copper, the argentiferous copper consisting of copper alloyed with silver in the percentage of from 7 oz. to 25 oz. of silver per ton of copper, and an inner lining of bearing metal on said bearing backing.

2. A bearing structure comprising a bearing backing formed of cold-worked argentiferous copper, the argentiferous copper consisting of copper alloyed with silver in the percentage of at least 7 oz. of silver per ton of copper, and an inner lining of bearing metal on said bearing backing.

3. A back for bearings formed of cold-worked argentiferous copper, the argentiferous copper consisting of copper alloyed with silver in the percentage of from 7 oz. to 25 oz. of silver per ton of copper.

HORACE W. GILLETT